(12) United States Patent
Stadtfeld et al.

(10) Patent No.: US 6,390,893 B1
(45) Date of Patent: May 21, 2002

(54) METHOD OF MACHINING GEARS

(75) Inventors: Hermann J. Stadtfeld, Rochester; Uwe Gaiser, Avon, both of NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/444,682

(22) Filed: Nov. 22, 1999

Related U.S. Application Data

(60) Provisional application No. 60/109,587, filed on Nov. 23, 1998.

(51) Int. Cl.$^7$ .................................................. B24B 1/00
(52) U.S. Cl. ........................... 451/47; 451/28; 451/161; 451/219
(58) Field of Search ............................ 451/28, 47, 161, 451/219

(56) References Cited

U.S. PATENT DOCUMENTS 4,981,402 A * 1/1991 Krenzer et al. ............... 409/26
5,580,298 A * 12/1996 Stadtfeld ........................ 451/1

OTHER PUBLICATIONS

Derwent Abstract No. 2000–411855.*
Litvin, F. L., "Method for Generation of Spiral Bevel Gears With Conjugate Gear Tooth Surfaces", *Journal of Mechanisms, Transmission, and Automation in Design*, Jun. 1987, vol. 109, pp. 163–170.

Stadtfeld, Hermann J., *Handbook of Bevel and Hypoid Gears*, Rochester Institute of Technology, Rochester, New York, 1992, pp. 135–139.

Gosselin, C. J., et al., "The Generating Space for Parabolic Motion Error Spiral Bevel Gears Cut by the Gleason Method", Journal of Mechanical Design, vol. 115, Sep. 1993, pp. 483–489.

\* cited by examiner

*Primary Examiner*—Joseph J. Hail, III
*Assistant Examiner*—Shantese McDonald
(74) *Attorney, Agent, or Firm*—Robert L. McDowell

(57) ABSTRACT

A method of machining at least one tooth flank of a gear with a finishing tool. The method comprises rotating the finishing tool, such as a grinding tool, and bringing the tool and the tooth flank into contact. Relative movement between the tool and the gear is provided to traverse the tool across the tooth flank along a path whereby the path produces a tooth flank geometry of a form which, when brought into mesh with a mating tooth flank to form a tooth pair under no load or light load, provides a motion graph curve that intersects, at least two times, a motion graph curve of at least one of an immediately preceding tooth pair and an immediately following tooth pair. The motion graph curve of the tooth pair describes contact between respective tooth flanks of said tooth pair from an initial entrance into mesh to a final exit from mesh as being over a gear rotation amount of greater than 1.0 pitch and preferably, about 1.5 pitch to about 3.0 pitch.

19 Claims, 11 Drawing Sheets

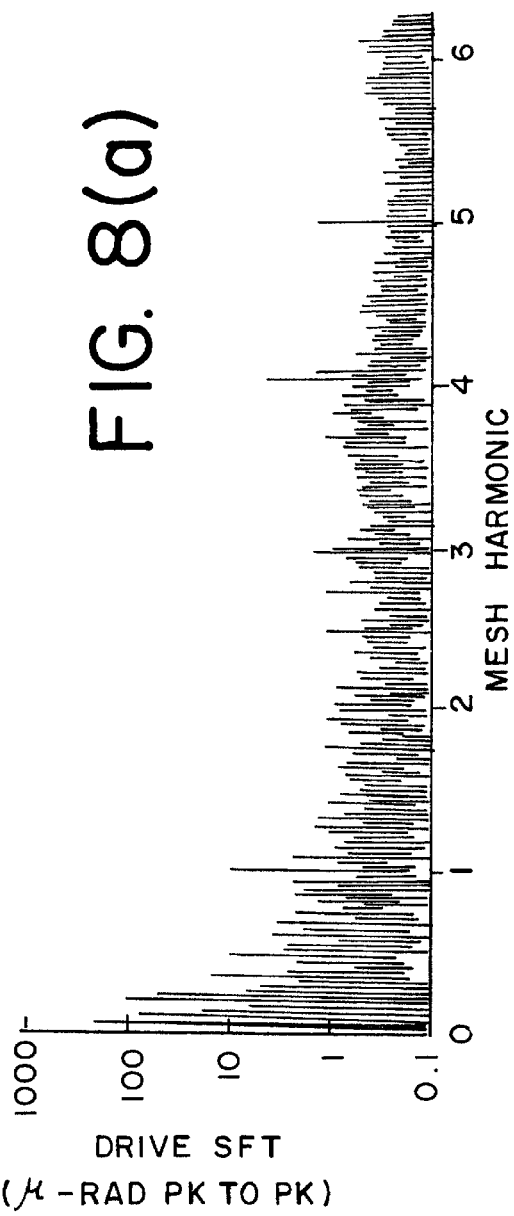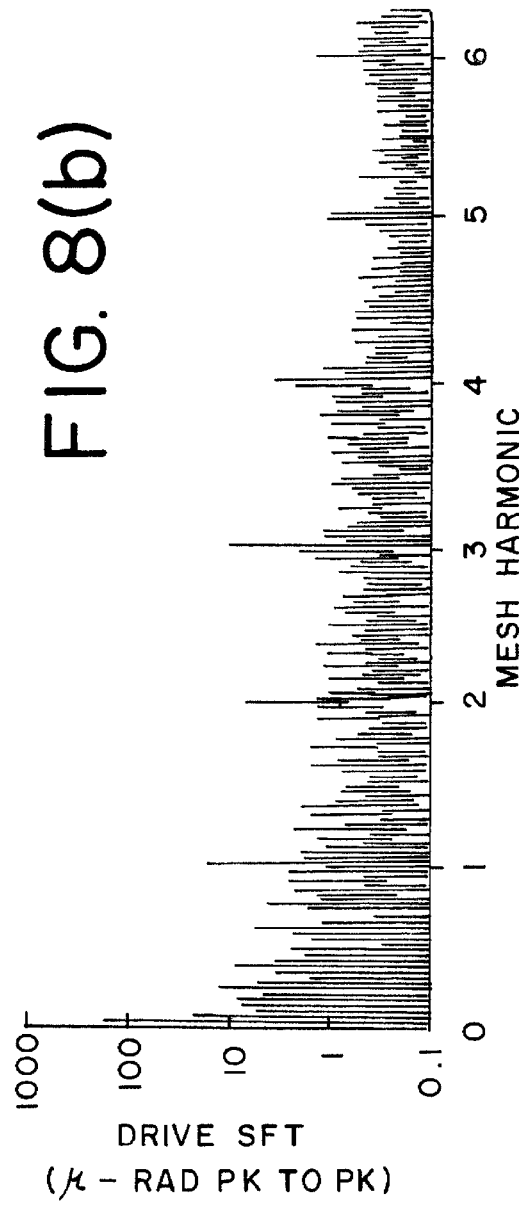

FIG. 12(a)
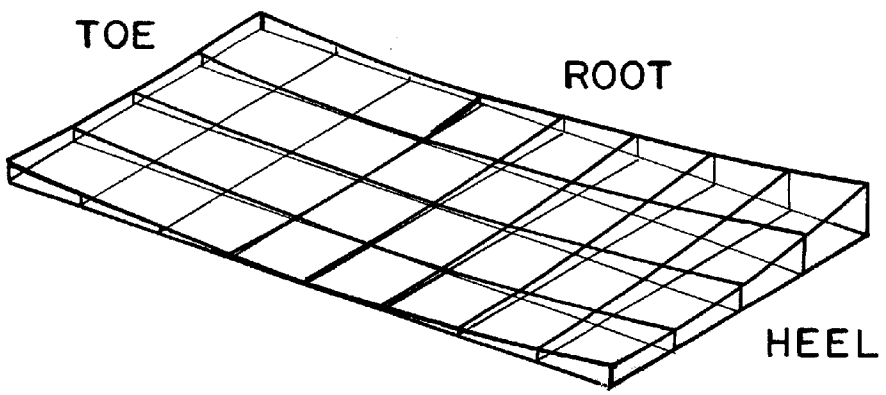
FIG. 12(b)
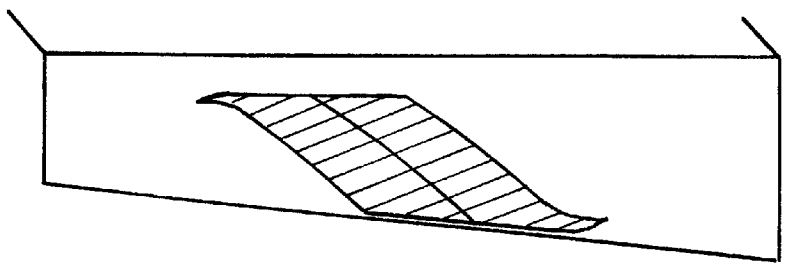
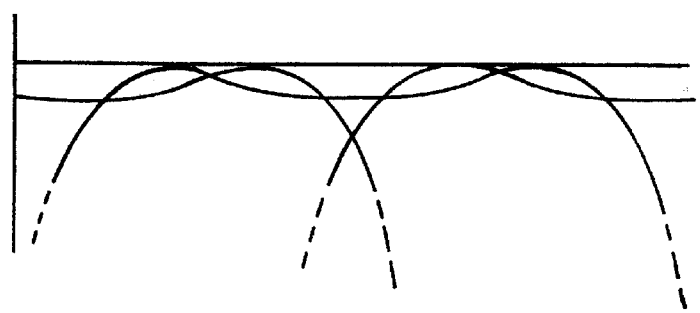
FIG. 12(c)

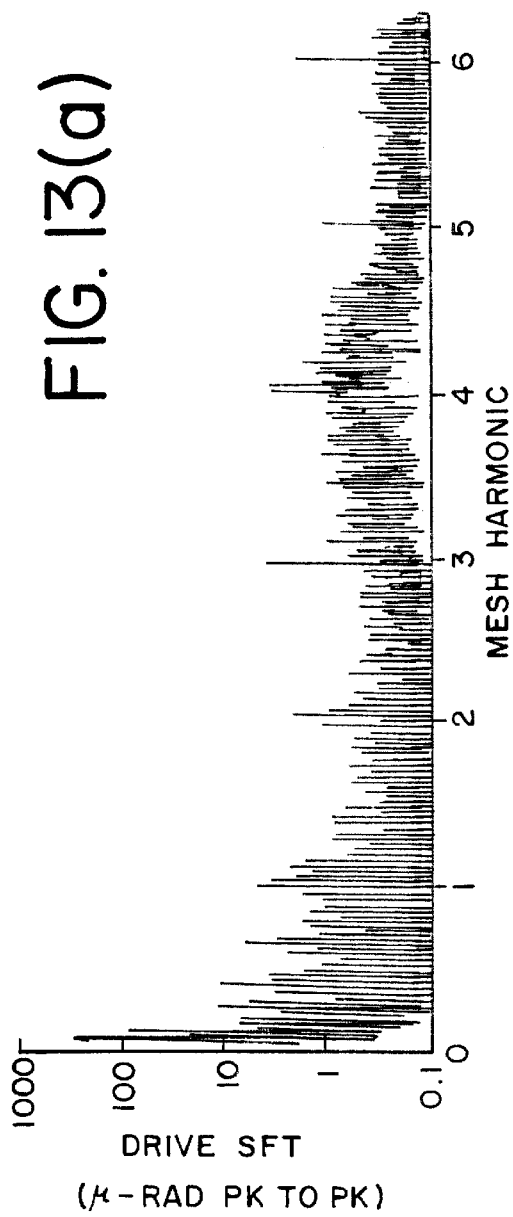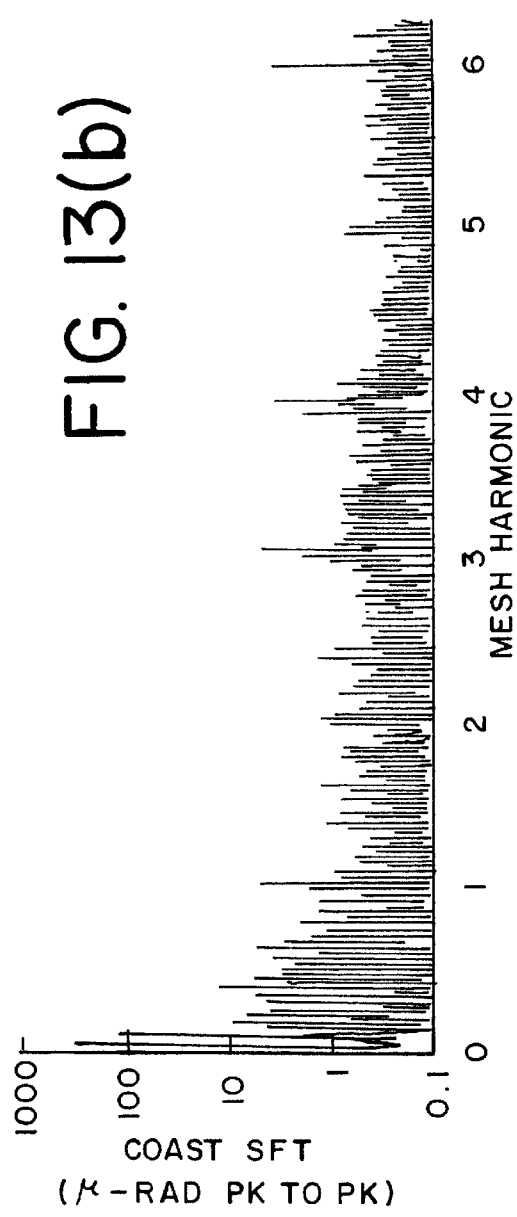

METHOD OF MACHINING GEARS

This application claims the benefit of U.S. Provisional Application No. 60/109,587 filed Nov. 23, 1998.

FIELD OF THE INVENTION

The present invention is directed to finishing toothed articles, such as gears. Particularly, the present invention discloses a method of finishing gears which results in a significant noise reduction when the gears are rolled in mesh with mating gears.

BACKGROUND OF THE INVENTION

It is well known in the gear industry that the area of bearing contact between tooth surfaces in mesh should be limited to keep the contact area within the boundaries of the teeth, thus preventing the tooth surfaces from coming into contact at their edges which can lead to tooth damage and/or gear failure.

In order to limit the area of tooth contact, it is necessary to modify a theoretical conjugate tooth flank surface by introducing modifications to limit the contact area under no load or light load to provide insensitivity to things such as gear housing tolerances, inaccuracies in the gear members and assembly, as well as deflections. Thus, instead of the entire tooth surface of mating flanks coming into contact during rolling, as would be the theoretical case with completely conjugate tooth flanks and a drive system having zero deflections and tolerances, mating flanks that have been modified usually contact one another at one point or along a line. Hence, the mating flank surfaces are conjugate only at this point or along the line. Contact is limited to an area of a size such that the contact area will remain within the tooth boundaries despite the effects of actual deflections, tolerances and load.

In bevel gears, there are three mechanisms for creating tooth flank surface modifications that have the intent to locate the tooth bearing contact. These modifications are generally known as "crowning". Specifically, the three types of crowning are: (1) "lengthwise" crowning which is a modification along the length (toe-to-heel or face width) of a tooth; (2) "profile" crowning which is a modification in the profile direction (root-to-top) of a tooth; and, (3) "flank-twist" crowning which is a twisting of a tooth flank in the length direction (from toe to heel). One or more of the above types of crowning can be applied to a tooth surface but usually all three types of crowning are utilized.

With crowning, however, comes motion error introduced by non-conjugate members rolling in mesh with one another. Generally, as crowning increases, so does the amount of motion error introduced into the mating tooth pair. Increased crowing does protect the teeth from damages of edge contact, however, the accompanying increased amount of introduced motion error prevents smooth rolling of the gears.

With motion error comes noise. Noise is due, to a large extent, to the impact of two mating teeth coming into mesh. It is known that as a pair of mating teeth with a parabolic motion graph roll in mesh, there is a linear decrease in angular velocity of the teeth of one member relative to the teeth of the other member. As such, relative angular acceleration has a constant negative value. However, as contact changes from the actual pair of teeth in mesh to the following pair coming into mesh, there is an instant increase in relative velocity, since the initial relative velocity of the following pair is greater than the final relative velocity of the actual pair. Given this sudden increase in velocity, there is likewise an effective momentary infinite increase in relative angular acceleration which physically is an impulse (i.e. a noise) that reflects the impact the following pair of teeth causes at the moment of first contact. This noise is repeated for each pair of teeth as they first come into contact. The result of these contacts is an audible noise of the tooth mesh frequency and/or multiples thereof.

One method that has been used to address the problem of gear noise is lapping. The highest removal of material in lapping takes place at the instant of impact because of the peak torque between the two mating members. In other words, the material that leads to disturbances will be removed during lapping. However, surface studies on lapped gearsets have shown that some abrasive particles from the lapping compound attach themselves to the tooth flank which means a continuous "light lapping" takes place at all times when a gear set is in operation. Furthermore, the lapping compound particles tend to move from the tooth surface into the oil which lubricates the gear set thus amplifying the negative effect even more.

A proposal for reducing gear noise by introducing a fourth-order crowning along the path of contact is set forth in Stadtfeld, Handbook of Bevel and Hypoid Gears, Rochester Institute of Technology, Rochester, N.Y., 1992, pp. 135–139. The disadvantage associated with this approach is that it is effective under high load conditions but not under noise critical low load conditions.

Still another theoretical proposal to reduce gear noise is described in Litvin et al., "Method for Generation of Spiral Bevel Gears With Conjugate Gear Tooth Surfaces", Journal of Mechanisms, Transmission, and Automation in Design, Vol. 109, June 1987, pp. 163–170. In this procedure, crowning is introduced along the lines of contact. However, this process is ineffective in reducing noise.

It is an object of the present invention to provide a process for machining toothed articles which greatly reduces gear noise arising from impact of teeth as they enter into mesh.

It is another object of the present invention to provide a gear having at least one tooth surface made in accordance with the above process.

SUMMARY OF THE INVENTION

The present invention is directed to a method of machining at least one tooth flank of a gear with a finishing tool. The method comprises rotating the tool, such as a grinding tool, and bringing the tool and the tooth flank into contact. Relative movement between the tool and the gear is provided to traverse the tool across the tooth flank along a path whereby the path produces a tooth flank geometry of a form which, when brought into mesh with a mating tooth flank, under no load or light load, to form a tooth pair, provides a motion graph curve that intersects, at least two times, a motion graph curve of at least one of an immediately preceding tooth pair and an immediately following tooth pair.

The motion graph curve of the tooth pair may describe a fourth, or higher, even order function and is preferably of a shape comprising two maxima separated by two inflection points. The motion graph curve of the tooth pair describes contact between respective tooth flanks, under no load or light load, of said tooth pair from an initial entrance into mesh to a final exit from mesh as being over a gear rotation amount greater than 1.0 pitch and preferably, about 1.5 pitch to about 3.0 pitch.

BRIEF DESCRIPTION OF THE DRAWINGS

FIGS. 8(a) and 8(b) illustrate noise test results comparing, respectively, a lapped gear set with a gear set having contract line crowning.

FIGS. 12a, 12b and 12c illustrate, respectively, a drive side ease-off diagram, contact pattern and motion graph for a tooth surface formed in accordance with the motion graph of FIG. 10.

FIGS. 13(a) and 13(b) illustrate noise test results of, respectively, drive and coast sides of a gear developed in accordance with the motion graph of FIG. 10.

DETAILED DESCRIPTION OF THE PREFERRED EMBODIMENT

The present invention will be discussed with reference to the accompanying drawings.

Figure 1:
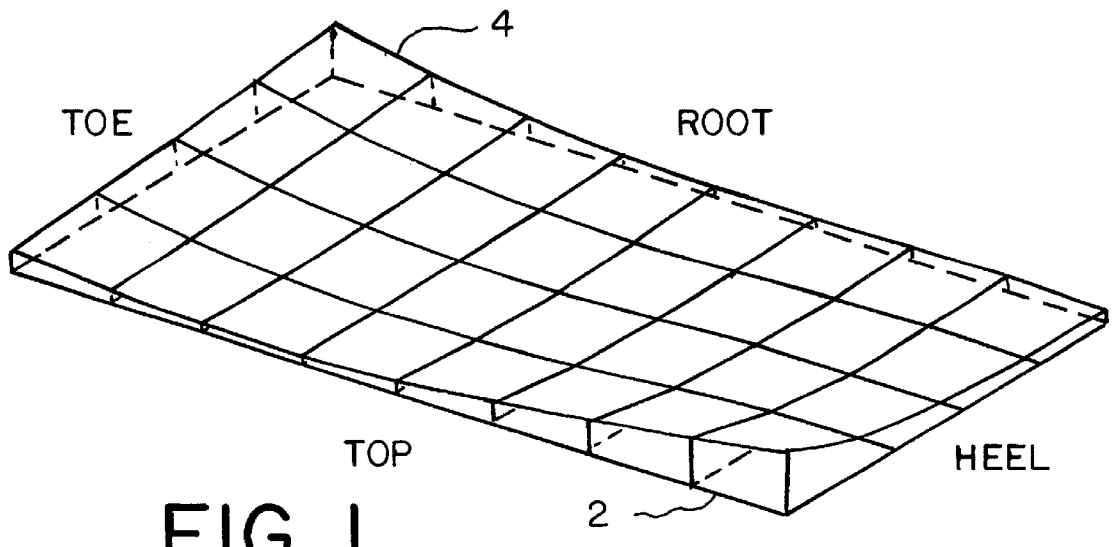
FIG. 1 shows an ease-off diagram illustrating flank twist crowning.
Figure 2:
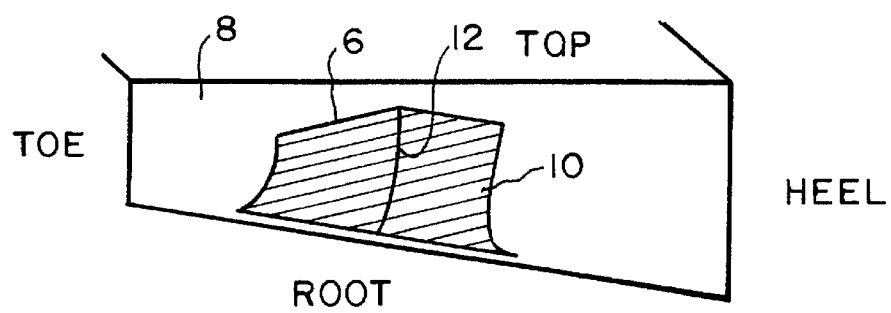
FIG. 2 illustrates contact pattern resulting from flank twist crowning.

FIGS. 1–3 illustrate and explain types of diagrams depicting contact characteristics between mating tooth surfaces of gear pair members. These types of diagrams are, per se, known in the art and are not themselves the object of the present invention but instead are being utilized to explain and illustrate the present invention. Diagrams such as those of FIGS. 1–3 are generated in response to data (such as basic gear design parameters, tooth contact data, tool and process data) input to computer programs known as Tooth Contact Analysis (TCA) programs. TCA programs are widely known and are commercially available from sources such as The Gleason Works, Rochester, N.Y.

FIG. 1 illustrates what is known in the art as an "ease-off" diagram which depicts the relationship between the topographies of mating gear tooth surfaces 2 and 4. Surface 2 is referred to as the presentation plane while surface 4 is the ease-off surface. However, for practical purposes, surfaces 2, 4 can be thought of representing the mating tooth surface topographies of, respectively, a bevel ring gear and a bevel or hypoid pinion for example. The ease-off diagram represents the interaction between the ring gear and pinion, roll position-by-roll position across the whole flank surface. In FIG. 1, the ease-off diagram represents flank-twist crowning. For the sake of reference, if mating tooth surfaces 2, 4 were completely conjugate (no crowning), presentation plane 4 (pinion tooth surface) would be a flat surface lying on top of presentation plane 2 (ring gear tooth surface) with no deviation in the ordinate direction.

FIG. 2 is a tooth contact diagram showing the contact pattern between the ring gear and crowned pinion discussed above with reference to FIG. 1. The contact pattern 6 is shown positioned on a tooth surface projection 8. The contact pattern 6 is made up of a series of lines of contact 10 and having a path of contact shown by line 12 extending in the root-to-top direction through contact pattern 6. In crowned gears, each contact line of a tooth pair, from beginning to end of mesh, has one point of contact where there is no load. These points define the path of contact.

Figure 3A:
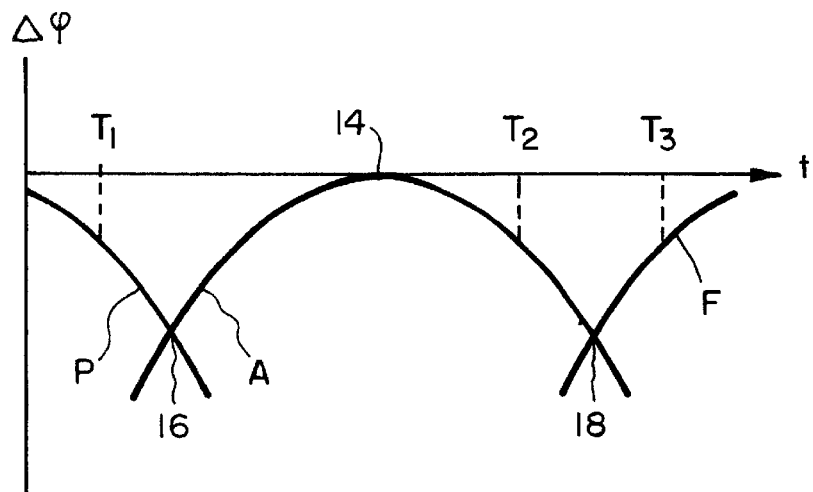
FIG. 3(a) is a motion graph depicting motion error of flank twist crowned tooth surf in mesh.

FIG. 3(a) is a motion graph representing the motion error introduced principally by crowning although other contributors such as part inaccuracies and deflections play a smaller role. Motion graphs illustrate the relationship between (1) $\Delta\phi$, which is the difference in angular position of one member of a gear pair relative to the other member, and (2) t, which is time. Of course, the skilled artisan will understand that any angular position differences due to the gear ratio are excluded.

Figure 3B:
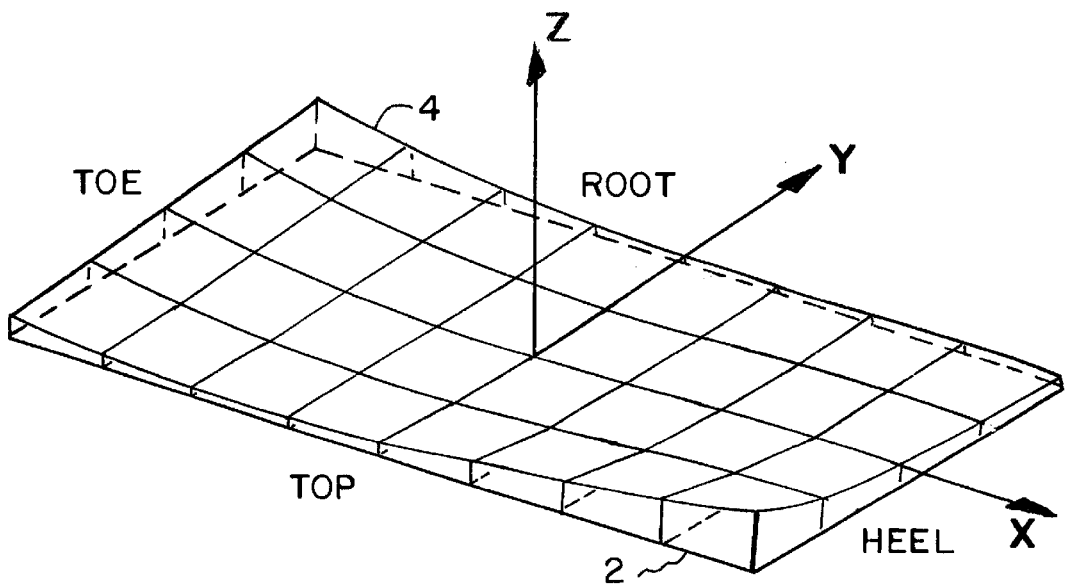
FIG. 3(b) illustrates a coordinate system for defining the parabolic crowning element.

Practically all real motion errors have a parabolic shape caused by the parabolic crowning element as illustrated in FIG. 3(b) in which lengthwise, profile and flank-twist crowning, as shown in FIG. 1, are each represented in the X,Y,Z coordinate system by the parabolic function $z=Ax^2+By^2+Cxy$. In FIG. 3(a), $\Delta\phi$ represents the difference in angular position of each tooth of the rotating tooth pairs while t represents time. The motion error of the actual gear tooth pair in motion is shown by curve A while the end portion of the motion error curve of the preceding tooth pair is shown by P and the beginning portion of the motion error curve of the following tooth pair is shown by F.

Referring to the curves of a motion graph, for example curves A, P and F of FIG. 3(a), the amount of the difference in angular position is determined at any time t by the distance $\Delta\phi$ between the particular curve and the timeline, axis t. As an example with reference to FIG. 3(a), at time $T_1$, the amount of motion error in tooth pair P is represented by the distance $\Delta\phi$ between axis t and the curve P directly below $T_1$. Similarly at time $T_2$, the amount of motion error in tooth pair A is represented by the distance $\Delta\phi$ between axis t and the curve A directly below $T_2$. Since the motion error is represented by the distance between a point on the axis t and a curve below the axis, the axis t and a particular curve may be thought of as representing the relative angular motion of respective members of a tooth pair with the distance between them ($\Delta\phi$) at any time being the amount of motion error.

The time line t is positioned such that it is tangent to the maximum point or points of the curves illustrated on the motion graph. These maximum points represent points of conjugacy of the tooth pairs and at these points, no motion errors exist. If a particular motion error curve comprises a line coincident with line t, then a line of conjugacy exists instead of a point. In FIG. 3(a), the motion error curve A of the actual gear tooth pair, has a maximum at 14, which is a point of conjugacy. Regarding load on the tooth pairs, in motion graphs, that curve directly below any point on the time line t indicates the tooth pair carrying the load at that time. For example, at time $T_1$, the load is carried by tooth pair P, while at time $T_2$ the load is now carried by tooth pair A and at time $T_3$ the load is carried by tooth pair F.

Looking at FIG. 3(a), and starting with curve P, it can be seen that the previous gear tooth pair is rotating toward the end of mesh which occurs at point 16 where motion curve A of the actual gear tooth pair intersects curve P. Point 16 represents the point where impact occurs between tooth surfaces of the actual gear pair and it is at this point where any load is transferred from the previous gear tooth pair P to the actual gear tooth pair A. At point 16, the amount of motion error (the distance between point 16 and line t) is considerable but as the gear tooth pair continues to rotate toward the maximum point 14, the amount of motion error decreases up to the point of conjugacy at 14. Once past point 14, the tooth pair continues to rotate toward the end of their mesh at 18 and during this time, the amount of motion error increases. At point 18, mating tooth surfaces of the following tooth pair F impact one another and any load is transferred to the tooth pair F. The distance between points 16 and 18 represents one pitch.

Figure 4A:
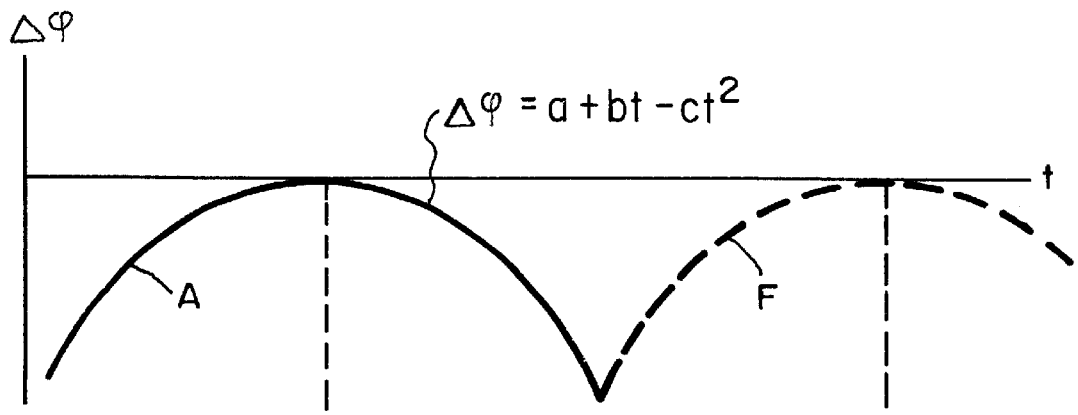
FIGS. 4a, 4b and 4c illustrate, respectively, the angular transmission, angular velocity change and the angular acceleration during a tooth mesh.
Figure 4B:
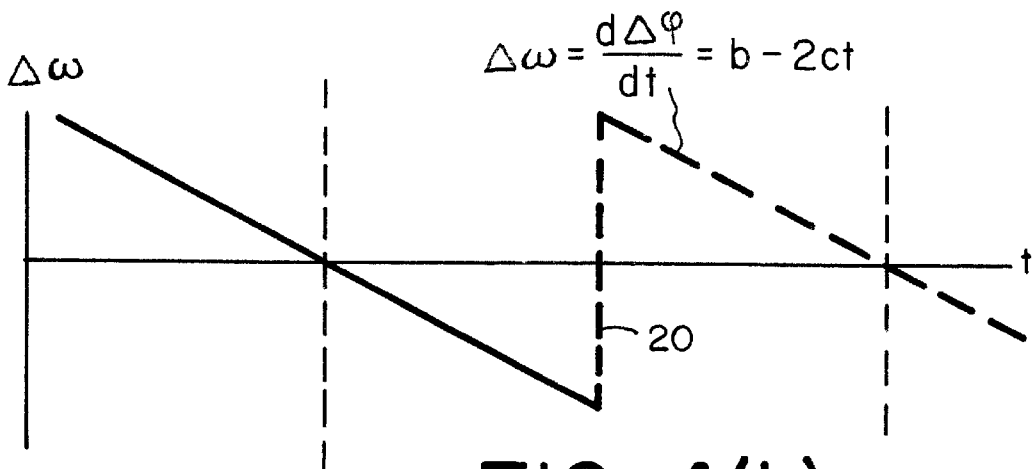
Figure 4C:
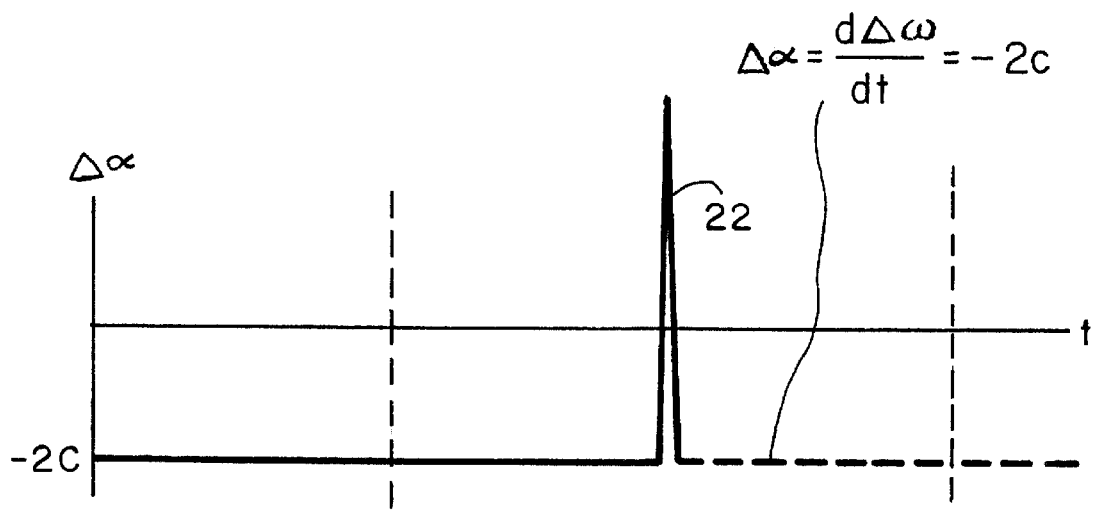

As discussed above, with motion error comes noise which is due, to a large extent, to the impact of two mating teeth coming into mesh usually under no load or light load. FIGS. 4(a), 4(b) and 4(c) illustrate angular transmission, velocity and acceleration, respectively, for an actual tooth pair in mesh and the following tooth pair.

FIG. 4(a) shows a typical parabolic curve illustrating angular transmission, $\Delta\phi$, for an actual tooth pair A and following tooth pair F. The curve A can be represented by the equation $\Delta\phi = a + bt - c t^2$.

FIG. 4(b) represents the change in relative angular velocity, $\Delta\omega$, which is the first derivative of the above equation. Hence, $$\Delta\omega = \frac{d\Delta\varphi}{dt} = b - 2ct,$$

which describes a linear decrease in relative angular velocity of the teeth as the pair of mating teeth roll in mesh.

FIG. 4c represents the change in relative angular acceleration, $\Delta\alpha$, of the tooth pair which can be shown by the derivative of the above velocity equation. Hence, $$\Delta\alpha = \frac{d\Delta\omega}{dt} = -2c$$

which is a straight line and as such, the relative angular acceleration is constant.

However, as contact changes from the actual pair of teeth in mesh to the following pair coming into mesh, such as at 18 in FIG. 3(a), there is an instant increase 20 in relative velocity since the initial relative velocity of the following pair is greater than the final relative velocity of the actual pair. Given this sudden increase in velocity, there is likewise an effective momentary infinite increase 22 in relative angular acceleration which physically is an impulse (i.e. a noise) that reflects the impact the following pair of teeth causes at the moment of first contact at 18. This noise is repeated for each pair of teeth as they first come into contact.

It is generally known that the intersection between a steady monotonic dropping function and a steady monotonic rising function will not have any overlap but just a defined crossing point. Applied to motion graphs in the vicinity of a crossing point, this crossing point is the point of impact, which is a primary source of noise as discussed above with reference to FIGS. 4(a)–4(c).

Figure 5:
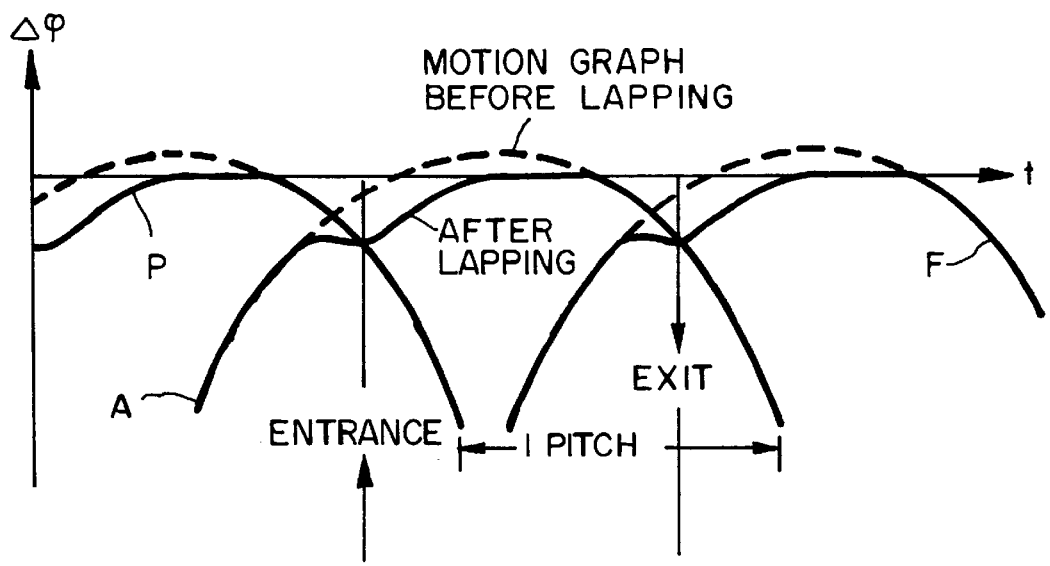
FIG. 5 is a motion graph of a lapped gear set.

FIG. 5 represents the motion error graph of a lapped bevel gear pair and shows a parabola shaped motion graph and its modification by lapping. As stated previously, in lapping, the highest removal of material takes place at the instant of impact. Therefore, since most of the material that leads to noise on a tooth surface is located at the point of impact, this material will be mostly removed by lapping. The effect is a flattening of the motion error curve at the top and the formation of a sinusoidal or third order modulation at the entrance area. Since the motion curve is not steadily monotonic at the entrance area, there is a reduction in the abrupt intersection of motion curves P and A at the entrance. In other words, at the entrance, the slope of curve A is changed to more closely match the slope of curve P thus resulting in curves A and P "blending" with one another (see the discussion of FIGS. 14(a) and 14(b) below). Hence, impact is lessened and the noise due to impact is also reduced.

The shape of the motion curve at the entrance suggests the potential for overlap of curve A with curve P, or curve A with curve F. Overlapping curves are indicative of multiple teeth in mesh, the idea of which is known. However, the only solution to achieve overlapping is with conjugate tooth contact, under no load, which will not function under realistic conditions.

Figure 6:
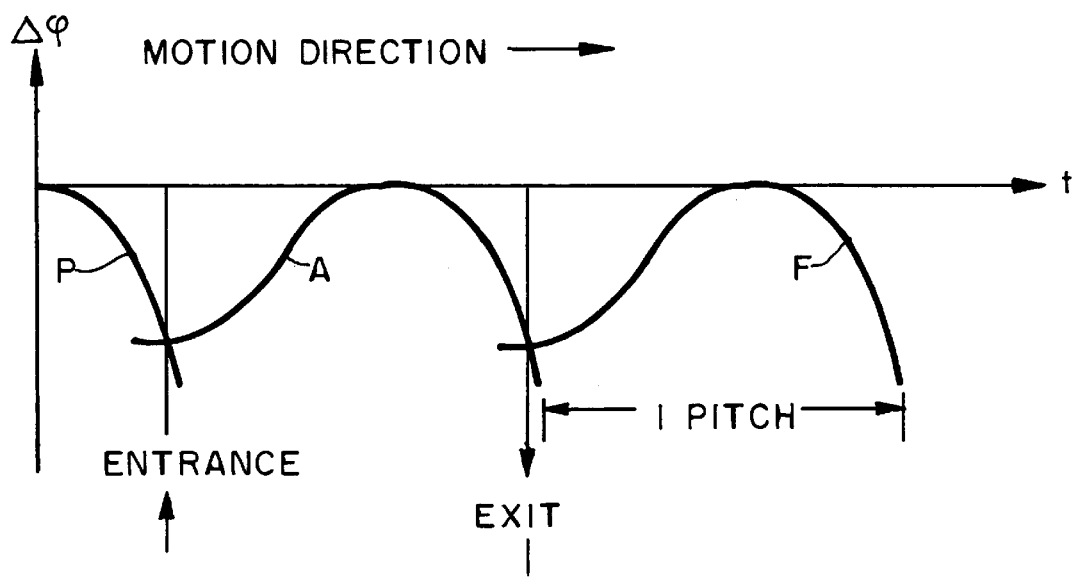
FIG. 6 is a motion graph of a gear set having a fourth order crowning along a path of contact.

FIG. 6 illustrates the motion error associated with a fourth order crowning along the path of contact as previously discussed. That portion of the curve between the entrance and the maximum is modified in form to better blend curves A and P at the impact point thus reducing the peak in acceleration (FIG. 4c). However, the portion of the motion curves between the maximum and "Exit" is still parabolic. This approach has shown to be advantageous only under a load which effectively flattens the motion curves, including the parabolic region (i.e. under load, the zero point of $\Delta\phi$ effectively moves down thereby flattening the curves P, A and F), resulting in a better blend of the curves at the entrance points thereby reducing impact and noise. When the load is removed, the motion graph returns to the form of FIG. 6 and the entrance points, while exhibiting improved noise conditions, still are a source of impact noise.

Figure 7:
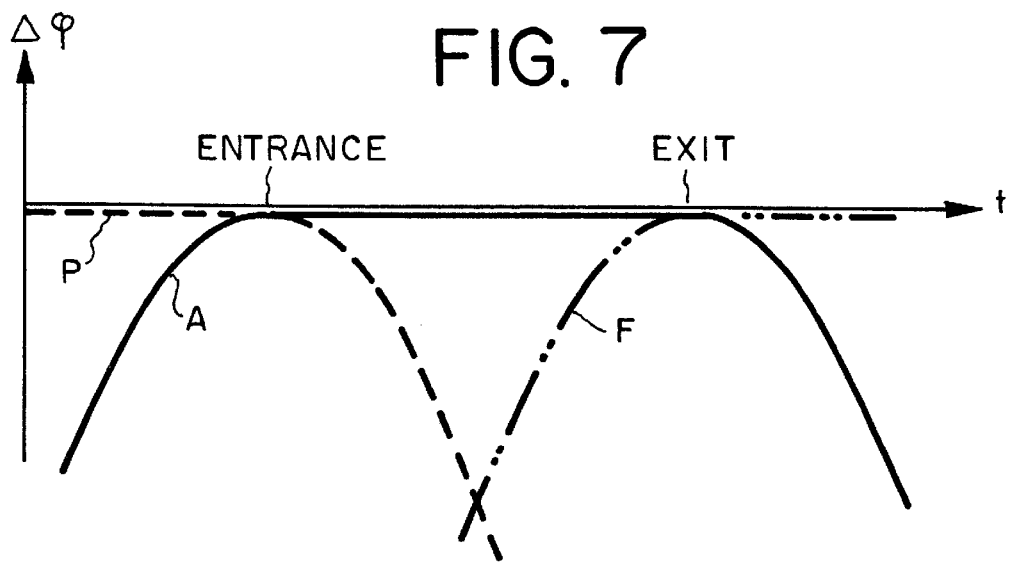
FIG. 7 is a motion graph of a gear set having contact line crowning.

FIG. 7 illustrates a motion graph resulting from the previously discussed contact line crowning. This approach requires great accuracy around the mean point of the tooth and as such is unrealistic for practical purposes given the required accuracy of the flank surfaces and the positioning of the members of the gear set in the exact operating position when the gearset is assembled.

While the load carrying portions of motion curves P, A and F appear to collectively form a continuous horizontal line at the maximum height position (at line t) thereby indicative of no motion error, noise tests reveal no appreciable reduction in noise levels compared to conventional parabolic motion error shapes. Further investigation reveals that small gaps exist between two horizontal, straight motion error lines (for example, between P and A at the entrance point) thus causing some acceleration peak and also a step in tooth pair stiffness.

The transition between two horizontal motion curves may have a gap, overlap or there may be some slight misalignment of the motion curves. In any case, an undesirable abrupt change in tooth-pair-stiffness of the global "driver-driven" system will prevent smooth rolling and cause noise. Since contact line crowning requires extremely high accuracy, it is most likely impossible to avoid even small steps between straight motion lines as a result of flank form variations or misalignment between a pinion and ring gear.

Figure 9:
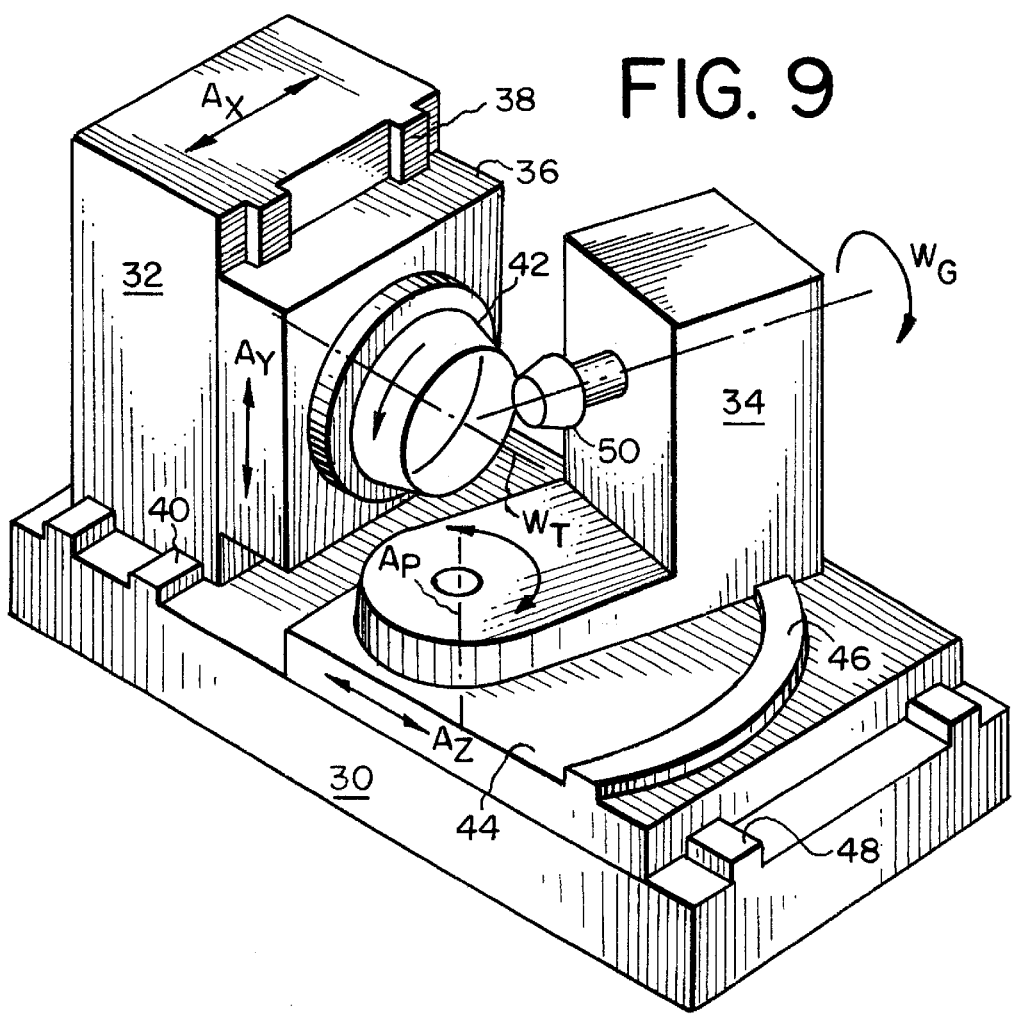
FIG. 9 schematically illustrates a free-form six-axes gear manufacturing machine.

To realize the flank form modifications required for the fourth order path of contact crowning of FIG. 6 and the contact line crowning of FIG. 7, gears were ground on a free-form bevel gear grinding machine (FIG. 9 discussed below) utilizing motion concepts as disclosed by Stadtfeld in U.S. Pat. No. 5,580,298 the disclosure of which is hereby incorporated by reference.

Noise tests were conducted on the ground gears and compared to the noise level of a lapped gear set. The measure of noise was the level of the first six harmonic frequencies of the tooth mesh. Those levels were generated by applying Fast Fourier Transformation (FFT) to a single flank measurement and to the noise recordings of the gear sets in a vehicle test. In FIGS. 8(a) and 8(b) respectively, the FFT results of the lapped master gear set and the gear set having contact line crowning (FIG. 7) are displayed. With respect to the contact line crowning, the difference between theoretical expectations and the measured result is significant. Even under a light load, just enough to avoid separation of the mating tooth flanks at 60 RPM, the gear set emitted a rough buzzing sound. The FFT result in FIG. 8 (b) reflects this with a high level of the first harmonic mesh frequency.

As for the noise levels of gears having a fourth order crowning along the path of contact, the noise levels are below those of the contact line crowning of FIG. 8(b) but greater than the lapped gear set of FIG. 8(a).

Given the above discussion, the requirements for a gear set with no first harmonic frequency preferably includes a tangential blending motion graph, non-sensitivity to misalignment and flank form tolerances, no abrupt changes in tooth pair stiffness, elimination of first and higher order disturbances due to ease-off, highest possible effective contact ratio under no load and light load, and, prevention or dissipation of tooth mesh frequency including their higher harmonic multiples.

In accordance with the present invention, the inventors have developed a tooth surface geometry and a method of finishing tooth flanks to produce a surfaces that are defined by a motion graph representative of mating tooth flanks, under no load or light load, wherein audible noise has been reduced or even dissipated. For the purposes of the present invention, the term "light load" is defined as a load of up to twenty five percent (25%) of the endurance load of the gear (ring gear or pinion) material. A preferred motion graph developed using the techniques of this invention is shown in FIG. 10.

Figure 10:
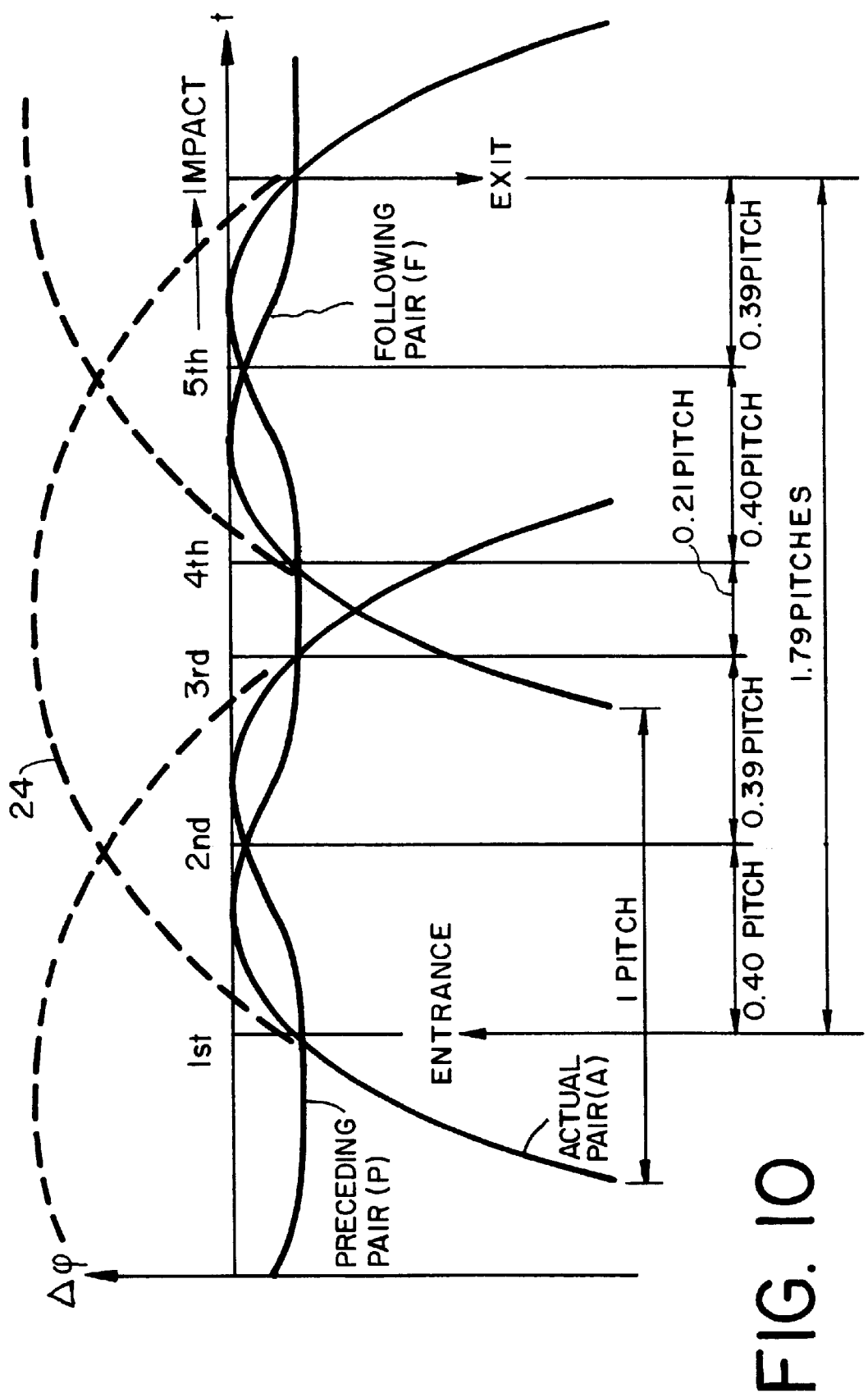
FIG. 10 illustrates the inventive motion graph.

The motion graph of FIG. 10 consists of a fourth order function and although a fourth order function is preferred, higher even-order functions are also contemplated. Attention is directed to the motion curve for the actual pair PA wherein, for this example, after the first impact at the "Entrance" of the tooth mesh where pair A assumes the load, a second impact occurs after rotation of 0.40 pitch. After the second impact, the preceding pair P takes over the load for 0.39 pitch at which point the third impact occurs where the actual pair A again takes over the load for 0.21 pitch. At the fourth impact, the following pair F takes the load for 0.40 pitch until the fifth impact occurs where the actual pair A again takes the load for 0.39 pitch until its reaches the "Exit". It can be seen that from the "Entrance" to the "Exit," the actual tooth pair A is in and out of mesh over a distance of 1.79 pitches.

Figure 14A:
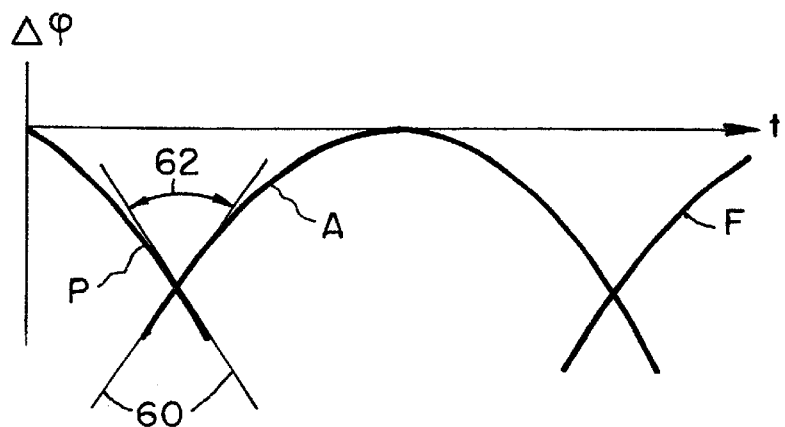
FIGS. 14a and 14b compare the inclination angle of curves at the point of impact for, respectively, a conventional motion graph and a motion graph of the present invention.
Figure 14B:
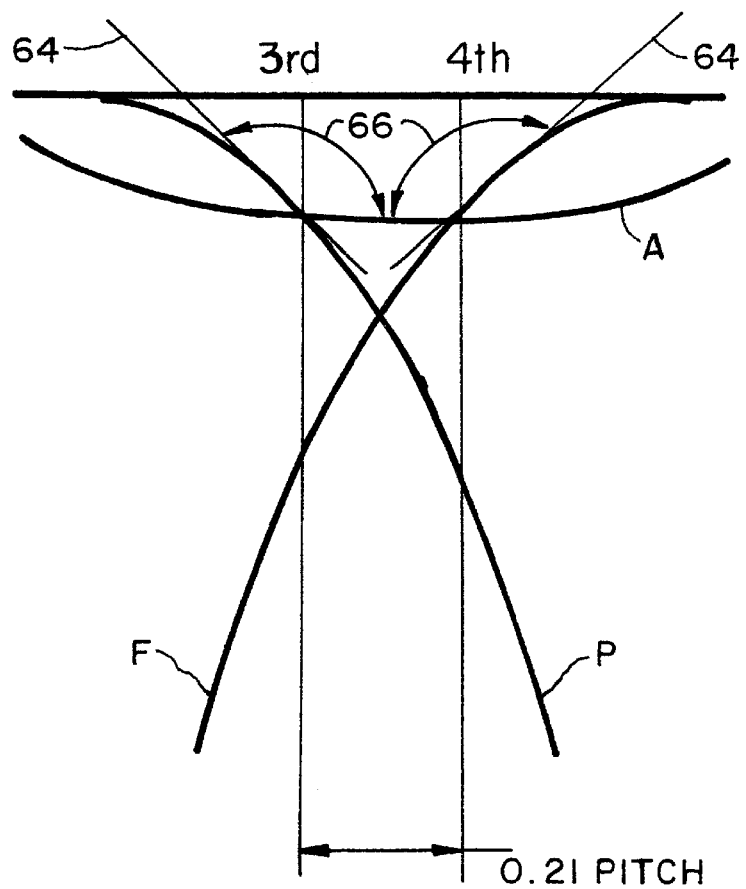

The many different impacts have different spacing along the timeline axis t. The angular inclination between the tangents of the curves (left and right) adjacent the impact point is significantly higher than the angular inclination between the tangents for the curves of the conventional parabolic motion error 24 adjacent an impact point. FIG. 14(a) shows a conventional motion graph wherein it is seen that the angle 62 between tangents 60 of the conventional motion curves is about 90 degrees while in FIG. 14(b), which is an enlarged portion of FIG. 10, the angles of inclination 66 of the tangents 64 with curve A (which is nearly horizontal) at the third and fourth impact points are each about 135 degrees.

Figure 11A:
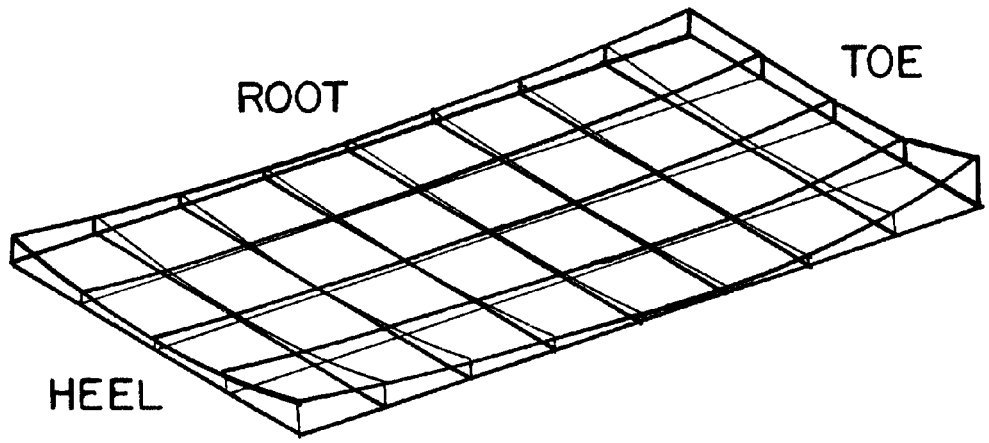
FIGS. 11a, 11b and 11c illustrate, respectively, a coast side ease-off diagram, contact pattern and motion graph for a tooth surface formed in accordance with the motion graph of FIG. 10.
Figure 11B:
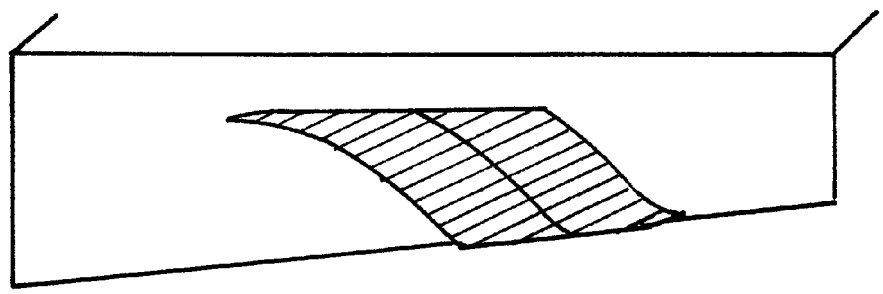
Figure 11C:
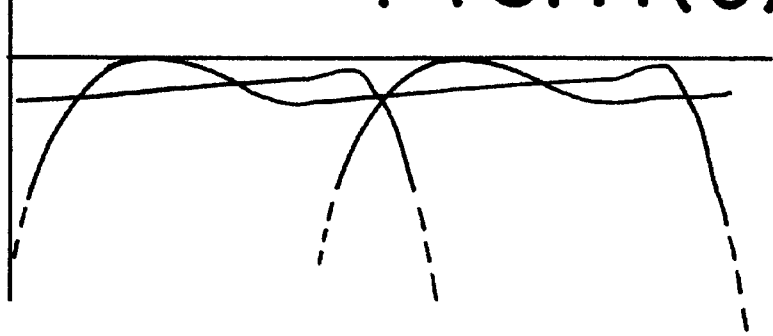

FIGS. 11 and 12 shows the real contact analysis (ease-off, tooth contact pattern, motion graph) for both coast side (FIGS. 11a–11c) and drive side (FIGS. 12a–12c) of a generated, face mill cut and ground pinion.

Comparing FIGS. 11 and 12 to FIG. 10 shows that the parabolic-shaped conventional motion error has been converted to a motion error curve that extends over a distance greater than 1.0 pitch and, preferably, about 1.5 to about 2.0 pitch. Extending the length of the motion error curve and creating a plurality of impacts with preceding and/or following tooth pair motion error curves over said extended length effectively eliminates the root (i.e. the V-shaped intersection of conventional motion error curves) of the existing parabolas thus also eliminating sharp impacts and their accompanying noise. The fourth-order, or higher, function that combines the two maxima with the minimum provides the adjustability of a lapped gear set or even better. This also generates in conjunction with the preceding and the following motion graphs five defined impacts instead of one. Many small impacts of three different teeth during the mesh of the actual observed tooth reduces or even dissipates audible noise. Noise reduction is further enhanced by the fact that the elapsed time between impacts is not repeated in consecutive intervals as is shown by the varying amounts of pitch between impacts as seen in FIG. 10. Given the importance of a number of impacts during mesh for reducing noise, the motion graph of the actual tooth pair being observed should cross, at least two times, either or both of the preceding tooth pair motion graph and the following tooth pair motion graph.

It should be understood that although the straight timeline, t, and an associated curve (curve A in FIG. 10, for example) may be thought of as representing the relative angular motion of respective members of a tooth pair, it is not correct to reason that all motion error is due to the flank geometry of one member of a gear pair (as shown by the curve) and the other member of the gear pair comprises no motion error (as shown by the straight line, t). One must be reminded that the timeline axis, t, and a particular curve may be thought of as representing the relative angular motion of respective members of a tooth pair with the distance between them (Δφ) at any time being the amount of motion error. Therefore, both members may have some motion error but it is the total amount of error that is of concern and which is represented by the motion graph.

It follows that in the present invention, the skilled artisan will recognize that the tooth surfaces of either member of a mating gear set may be machined in order to arrive at the desired motion graph with the tooth surfaces of the other member remaining in some reference condition such as a theoretical conjugate tooth surface. However, the present invention also contemplates tooth surfaces of both mating members being machined by respective tools such that when brought into mesh, the mating tooth surfaces together provide the desired motion graph. In this instance, the motion graph would appear in the same general manner as shown in FIG. 10 with a straight timeline, t, and associated motion curves. Even though both members comprise some motion error, the motion graphs are indicative of total amount of error of one member relative to the other.

Although some may believe that the exit area of a motion graph needs no attention, this is not necessarily correct. The exit portion of the preceding motion graph leads into the entrance of the actual motion graph. The motion graph of a lapped gear set (FIG. 5) already makes this clear, for example. The relationship between exit and entrance areas has become more significant since one complete tooth mesh presents five entrance and exit points. Looking at FIG. 14 shows that tangents on the exit and entrance side (left and right) of one impact point encloses an angle of more than 135 degrees. Ideally, an enclosed angle of 180 degrees is desired but conventional parabola shaped graphs enclose an angle below 90 degrees. This angle is formed by the exiting end of the preceding graph and the entering end of the actual graph, which stresses the equal importance of the motion graph characteristic on both ends.

FIG. 13(a) displays the measurement results of the drive side (pinion concave and gear convex). The peaks between the first and fourth mesh frequency have nearly the same magnitudes of 5 to 6 micro-radiant. The irregularity of the levels of fifth and higher harmonics is judged to be an advantage in the overall noise emission rating.

FIG. 13(b) shows the coast side measurement results. The first, third, fourth and sixth harmonic levels of motion error almost have the same magnitude. All other peaks are in the vicinity of 5 micro-radiants and less.

The present inventive method is preferably carried out on a free-form gear manufacturing machine of the type disclosed by U.S. Pat. No. 4,981,402 to Krenzer et al. and shown in FIG. 9. This machine comprises a machine base 30, tool head 32, and work head 34. Tool slide 36 is mounted for linear movement ($A_Y$) to tool head 32 via ways 38 and tool head 32 is mounted for linear movement ($A_X$) to machine base 30 via ways 40. Tool 42 is mounted to tool slide 36 and is rotatable about tool axis $W_T$.

Work head 34 is mounted for arcuate (pivoting) movement ($A_P$) to work table 44 via way 46, and work table 44 is mounted for linear movement ($A_Z$) to machine base 30 via ways 48. Work gear 50 is mounted to work head 34 and is rotatable about work gear axis $W_G$.

In developing the tooth flank surface of FIGS. 11 and 12 with the present inventive method, a motion graph is developed, based on the particular tooth surface and contact pattern desired, by utilization of tooth contact analysis software (such as T2000 TCA software commercially available from The Gleason Works) and the procedure set forth in previously mentioned U.S. Pat. No. 5,580,298, to arrive at the appropriate motion graph. For reference purposes, the mating gear member was a length crowned, non-generated, face milled ring gear. For example, this procedure includes the steps of:

1. starting with a base TCA diagram for further optimization;
2. introducing lengthwise curvature to the coast and drive sides;
3. on drive side—changing bias-direction to a moderate "bias-in" contact;
4. on drive side—introducing profile crowning;
5. on drive side—further modification on bias direction;
6. on drive side—proper positioning of motion curves;
7. on coast side—changing bias-direction to a moderate "bias-in" contact;
8. on coast side—contacting position in profile direction;
9. on coast side—continuing modification on bias-direction;
10. on coast side—introducing profile crowning;
11. on coast side—proper positioning of motion curves;
12. on drive side—proper positioning of motion curves;
13. on drive side—introducing profile crowning.

The above optimization steps were used to provide the motion graph as seen in FIGS. 11c and 12c. Once the desired motion graph is determined, machine settings (e.g. grinding machine settings) are obtained to direct motion of a tool relative to the surface of the workpiece about and/or along the axes of the machine in FIG. 9 to form the desired tooth surface.

For example, in forming the tooth surfaces of FIGS. 11 and 12 by grinding, the following machine settings were utilized:

| | |
|---|---|
| 1. Radial Distance | 78.2004 |
| 2. Tilt Angle | 20.98 |
| 3. Swivel Angle | −23.90 |
| 4. Work Offset | 21.8603 |
| 5. Machine Root Angle | −3.78 |
| 6. Machine Center to Cross Pt. | −0.8379 |
| 7. Sliding Base | 14.5363 |
| 8. Ratio of Roll | 3.307469 |
| 9. Modified Roll-2C | −0.02886 |
| 10. Modified Roll-6D | −0.00640 |
| 11. Modified Roll-24E | 0.66683 |
| 12. Modified Roll-120F | −0.10434 |
| 13. Helical Motion-1st Order | 7.9081 |
| 14. Helical Motion-2nd Order | 4.6356 |
| 15. Helical Motion-3rd Order | 3.8533 |
| 16. Helical Motion-4th Order | −90.5715 |
| 17. Vertical Motion-1st Order | 0.0000 |
| 18. Vertical Motion-2nd Order | 0.0000 |
| 19. Vertical Motion-3rd Order | 0.0000 |
| 20. Vertical Motion-4th Order | 0.0000 |
| 21. Radial Motion-1st Order | 0.1490 |
| 22. Radial Motion-2nd Order | 0.8902 |
| 23. Radial Motion-3rd Order | −4.0334 |
| 24. Radial Motion-4th Order | −45.8678 |

Additionally, in dressing the grinding wheel, the following information is also utilized in the dressing process:

| | |
|---|---|
| 1. Spread Blade/OB/IB | Spread Blade |
| 2. Wheel Diameter | 151.8970 |
| 3. Point Width | 1.8019 |
| 4. Outside Pressure Angle | 13.5004 |
| 5. Inside Pressure Angle | 27.9949 |
| 6. Outside Profile Radius of Curvature | 547.189 |
| 7. Inside Profile Radius of Curvature | 456.839 |

With grinding the tooth surfaces of workpieces in accordance with a motion graph as shown in FIG. 10, conventional lapping process is not necessary. For example, with grinding according to the inventive process, heat treatment deflections do not have any influence on the final ground flank form. Parts do not need to be stored in pairs as with lapped gear sets. Lapping grains entrained in the tooth surfaces or present as contaminants in the grinding lubricant are non-existent. Grinding of the blend radii in the root reduces the stress concentration significantly and the lifeline of the ground gear sets regarding bending strength can be increased by at least a factor of 2.

The present invention provides gears with good rolling and adjustability characteristics that are especially quiet and remain quiet despite deflection, inaccuracies in assembly or tolerances in the gear housing.

Although the present invention has been discussed with reference to bevel and hypoid gears, the invention is equally applicable to spur and helical gears.

Furthermore, the present invention lends itself not only to grinding, but also to other finishing processes such as skiving, shaving, honing as well as to cylindrical hobbing, tapered hob bevel gear machining, shaping, rolling and face milling and face hobbing cutting processes where some reduced amount of grinding or lapping may follow the process. Also, the present invention may find applicability to forged gears since the desired tooth surface geometry may be incorporated into the shape on the forging die.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining a tooth flank of a gear with a finishing tool, said method comprising:
    rotating said finishing tool and bringing said tool and said tooth flank into contact,
    providing relative movement between said tool and said gear to traverse said tool across said tooth flank along a path,
    whereby said path produces a tooth flank geometry of a form which, when brought into mesh with a mating tooth flank under no load or light load to form a tooth pair, provides a motion graph curve that intersects, at least two times, a motion graph curve of at least one of an immediately preceding tooth pair and an immediately following tooth pair.

2. The method of claim 1 wherein said motion graph curve of said tooth pair generally describes a fourth order or greater even order function.

3. The method of claim 2 wherein said motion graph curve generally describes a fourth order function.

4. The method of claim 1 wherein said motion graph curve of said tooth pair is of a shape having two maxima separated by two inflection points.

5. The method of claim 1 wherein said motion graph curve of said tooth pair describes contact between respective tooth flanks of said tooth pair from an initial entrance into mesh to a final exit from mesh as being over a gear rotation amount of greater than 1.0 pitch.

6. The method of claim 5 wherein said initial entrance into mesh to said final exit from mesh is over a gear rotation amount of about 1.5 pitch to about 3.0 pitch.

7. The method of claim 1 wherein said tool comprises one of a grinding wheel, skiving tool, honing tool, shaving tool, face milling tool, face hobbing tool, cylindrical hob or tapered hob.

8. The method of claim 1 wherein said tool comprises a grinding wheel.

9. The method of claim 1 wherein said gear comprises one of a bevel gear, hypoid gear, cylindrical gear or helical gear.

10. The method of claim 9 wherein gear comprises a bevel or hypoid gear.

11. The method of claim 10 wherein said gear comprises a bevel pinion or a hypoid pinion.

12. The method of claim 1 wherein said motion graph curve remains generally unaffected by a load applied to said tooth pair.

13. The method of claim 1 wherein said mating tooth flank is a conjugate tooth flank.

14. The method of claim 1 wherein said mating tooth flank is a non-conjugate tooth flank.

15. A method of machining a tooth flank of a gear with a tool, said method comprising:
    rotating said tool and bringing said tool and said tooth flank into contact,
    providing relative movement between said tool and said gear to traverse said tool across said tooth flank along a path,
    whereby said path produces a tooth flank geometry of a form which, when brought into mesh with a mating tooth flank under no load or light load to form a tooth pair, provides a motion graph curve describing contact between respective tooth flanks of said tooth pair from an initial entrance into mesh to a final exit from mesh as being over a gear rotation amount of greater than 1.0 pitch.

16. The method of claim 15 wherein said initial entrance into mesh to said final exit from mesh is over a gear rotation amount of about 1.5 pitch to about 3.0 pitch.

17. A method of machining a tooth flank of a gear with a tool, said method comprising:
    rotating said tool and bringing said tool and said tooth flank into contact,
    providing relative movement between said tool and said gear to traverse said tool across said tooth flank along a path,
    whereby said path produces a tooth flank geometry of a form which, when brought into mesh with a mating tooth flank under no load or light load to form a tooth pair, provides a motion graph curve describing contact between respective tooth flanks of said tooth pair comprising two or more entrances into mesh and two or more exits from mesh over a gear rotation amount of 1.0 pitch.

18. A method of machining tooth flank surfaces of mating gear members with a first tool for machining the tooth flank surfaces of one mating gear member, and a second tool for machining the tooth flank surfaces of the other mating gear member, said method comprising:
    rotating said first tool and bringing said first tool and the tooth flank of said one mating gear member into contact,
    providing relative movement between said first tool and said one mating gear member to traverse said first tool across the tooth flank along a first path,
    rotating said second tool and bringing said second tool and the tooth flank of said other mating gear member into contact,
    providing relative movement between said second tool and said other mating gear member to traverse said second tool across the tooth flank along a second path,
    whereby said first path and said second path produces respective tooth flank geometries of a form which, when said mating gear members are brought into mesh under no load or light load to form a mating tooth pair, provides a motion graph curve that intersects, at least two times, a motion graph curve of at least one of an immediately preceding tooth pair and an immediately following tooth pair.

19. A gear having a plurality of tooth flank surfaces with at least one tooth flank surface having a tooth flank geometry of a form which, when brought into mesh under no load or light load with a mating tooth flank to form a tooth pair, provides a motion graph curve that intersects, at least two times, a motion graph curve of at least one of an immediately preceding tooth pair and an immediately following tooth pair.

* * * * *